United States Patent [19]

Bernard et al.

[11] Patent Number: 4,591,129

[45] Date of Patent: May 27, 1986

[54] VALVE SEAL BREAKAWAY DEVICE

[75] Inventors: Jerald D. Bernard, Cedar Falls; Sarkis A. Koltookian, Waterloo, both of Iowa

[73] Assignee: Deere & Company, Moline, Ill.

[21] Appl. No.: 729,515

[22] Filed: May 2, 1985

[51] Int. Cl.[4] .................. F16K 29/00; F16K 31/363; F01B 11/02

[52] U.S. Cl. ...................... 251/64; 251/62; 92/85 A

[58] Field of Search ............. 192/113 B, 113 R, 87.1, 192/87.11, 109 F; 251/62, 63, 75, 64, 324, 284; 137/625.66; 92/85 A

[56] References Cited

U.S. PATENT DOCUMENTS 3,194,497  7/1965  Thorburn ........................ 92/85 A
3,825,033  7/1974  Hayner .......................... 137/625.66

Primary Examiner—Martin P. Schwadron
Assistant Examiner—John S. Starsiak, Jr.

[57] ABSTRACT

A spool valve has a seal-carrying spool movable in a valve bore terminated at one end by an end wall. A stem projects toward the end wall from an end of the spool. A hollow cylinder member is mounted coaxially on the stem via a radially inwardly extending flange which slidably receives the stem. A spring is coaxially mounted on the stem and is biased to urge the cylinder member away from the spool. A stop near the end of the stem retains the cylinder member on the stem and maintains a minimum preload in the spring. When the spool is in a position near the end wall, the end wall engages the cylinder member and moves it away from the stop, thereby compressing the spring so that the spring will be biased to move the spool away from the end wall.

3 Claims, 2 Drawing Figures

VALVE SEAL BREAKAWAY DEVICE

BACKGROUND OF THE INVENTION

This invention relates to a control system for controlling the flow of cooling and lube fluid through a torque-transmitting clutch.

In clutches, such as the traction or power-take-off (PTO) clutch on an agricultural vehicle, the clutch plates and discs are frictionally engaged. This friction generates heat and excessive heat can cause premature clutch wear and failure. For this reason, current production tractors, such as Deere 4-Wheel Drive Tractor Models 8450, 8650 and 8850, utilize hydraulically engaged wet clutches wherein cooled and filtered hydraulic oil is flowed through the clutch assembly. The cooling oil is flowed through these clutches continuously as long as they are engaged. However, energy is wasted when cooling oil flow is continued beyond the time when the excess heat has been removed from the clutch.

A system for providing intermittent lube flow is described in U.S. patent application Ser. No. 545,981, filed Oct. 27, 1983 (Attorney's File 12357) now U.S. Pat. No. 4,540,078 and assigned to the assignee of this application. However, this system in application Ser. No. 545,981 requires a complicated hydraulic circuit with many hydraulic valves and, therefore, would be expensive to produce.

SUMMARY OF THE INVENTION

An object of the present invention is to provide a simple, efficient and inexpensive intermittent clutch lube control system.

These and other objects are achieved by the present invention which includes a dual pilot-operated valve which opens and closes to control flow of lube fluid from a source to the lube circuits of a pair of torque-transmitting clutches. One of the pilots has a larger pressure-responsive area than that of the other pilot. The larger pilot is reponsive to fluid pressure from an operator-controlled clutch opening valve. The smaller pilot is communicated to system pressure via a check valve and via a flow restrictor.

DETAILED DESCRIPTION

Figure 1:
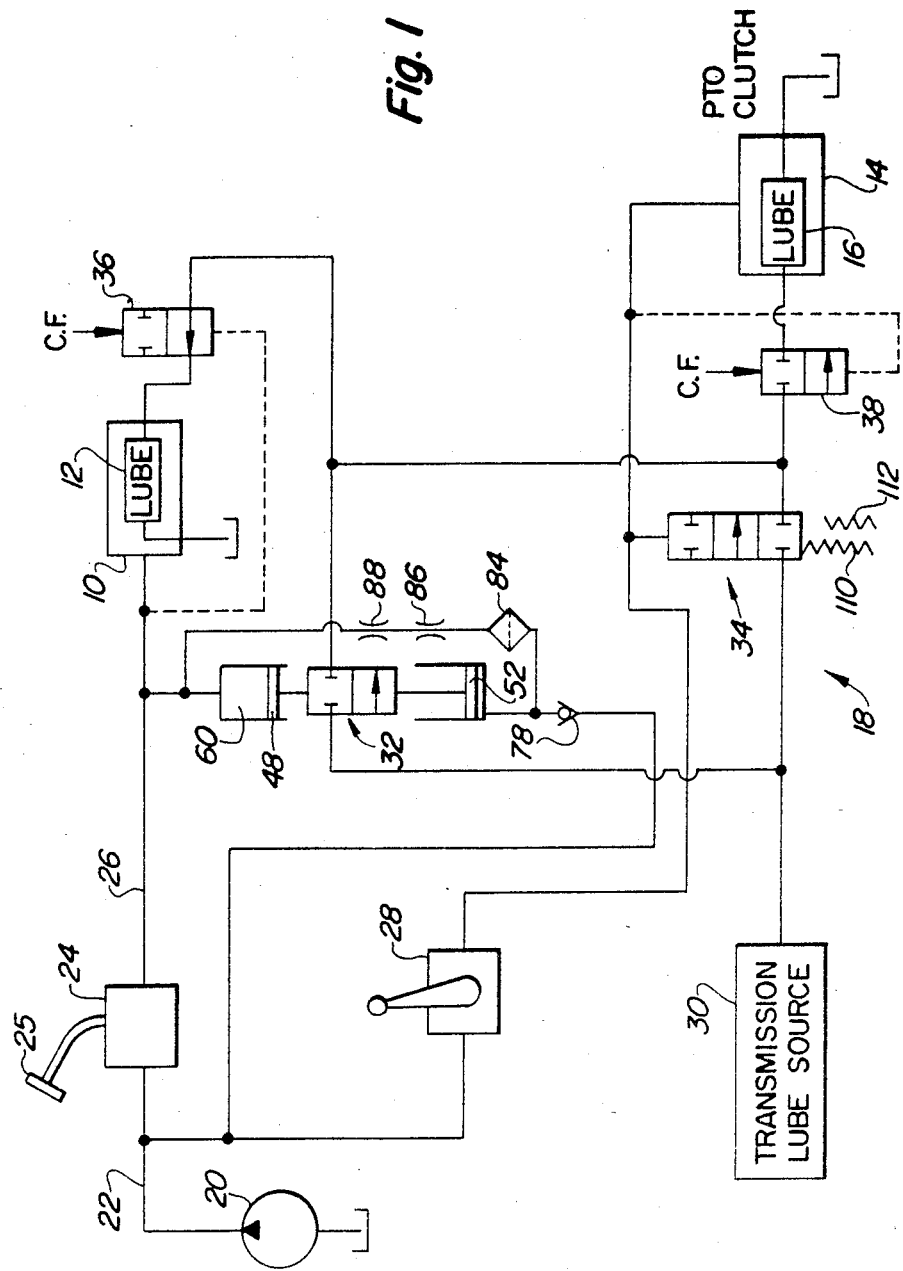
FIG. 1 is a schematic diagram of the applicant's clutch lube control system with the traction clutch engaged and the PTO clutch disengaged.

A conventional agricultural tractor (not shown) includes a conventional hydraulically-operated traction clutch 10 with a cooling or lubricating circuit 12 and a hydraulically-operated power-take-off (PTO) clutch 14 with a cooling or lubricating circuit 16. The clutches 10 and 14 and the lube circuits 12 and 16 are controlled by a control circuit 18.

Control circuit 18 includes a pump 20 which provides system pressure via line 22 to a conventional control valve 24 operated by pedal 25 which controls the operating pressure communicated to traction clutch 10 via line 26. Pump 20 also provides system pressure to control valve 28 which controls the operating pressure communicated to PTO clutch 14.

The control circuit 18 also includes a conventional lubricating oil source 30 for supplying lube oil to lube circuits 12 and 16 via clutch lube reduction delay valve 32 and a PTO lube reduction valve 34 and via conventional valves 36 and 38 which are opened by clutch operating pressure and which are closed by centrifugal force (C.F.).

Figure 2:
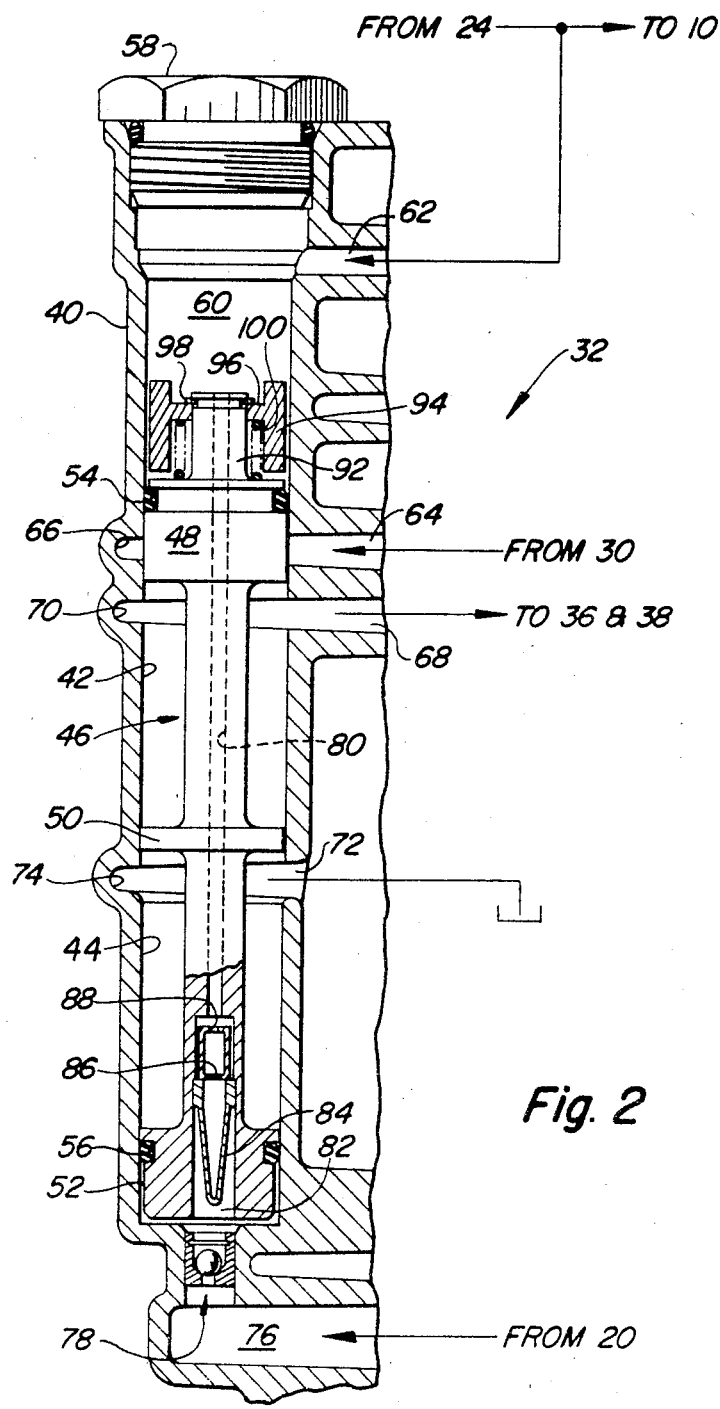
FIG. 2 is a detailed sectional view of a lube flow control valve of FIG. 1 with the clutch engaged.

Valve 32 is best shown in FIG. 2 and includes a housing 40 having a valve bore wherein with larger and smaller diameter portions 42 and 44 which slidably and sealingly receive a hollow valve member 46. Valve member 46 includes lands 48, 50 and 52. Lands 48 and 52 have annular grooves which receive O-ring seals 54 and 56, respectively. Lands 48 and 52 operate as pressure-responsive pilots.

The end of housing 40 is sealed by plug 58, thereby defining a first pilot chamber 60 which is communicated with traction clutch operating pressure from valve 24 via passage 62. Inlet passage 64 and groove 66 communicate the valve bore 42 with lube oil from source 30. Outlet passage 68 and groove 70 communicate the bore 42 with lube circuits 12 and 16 via valves 36 and 38. Passage 72 and groove 74 communicate bores 42 and 44 with the reservoir.

Another end of valve bore 44 is communicated with system pressure from pump 30 via passage 76 and check valve 78. A bore 80 extends through valve member 46. A filter screen 84 and orifices 86 and 88 are mounted in the bore 80. Thus, valve 32 is a two-position, normally closed valve which is pressure-operated by traction clutch operating pressure acting on land 48 and by system pressure acting on land or pilot 52.

A stem 92 projects beyond land 48 towards plug 58. A hollow cylindrical member 94 is slidably mounted on stem 92 via a hollow radially inwardly extending flange 96 which slidably receives the stem 92. A snap ring or stop 98 retains member 94 on the stem 92. A spring 100 biases member 94 into engagement with snap ring 98 whereby there is a gap of approximately 3 mm between land 48 and member 94. The member 94 extends beyond the end of stem 92 so that when valve member 46 is moved towards plug 58, the plug 58 engages member 94 and moves it away from stop 98 to compress spring 100 until member 94 engages land 48.

Normally, the pressure from valve 24 is high, the traction clutch 10 is engaged and valve 32 is in its normally closed position, as shown, and no lube fluid flows to lube circuits 12 and 16. This is because the pressure in chamber 60 acts on the larger area of land 48 while system pressure from pump 20 acts on the smaller area of land 52.

When pedal 25 is depressed, the pressure from valve 24 and in chamber 60 becomes low and the traction clutch 10 is disengaged and the system pressure acts on land 52 via check valve 78 to move valve member 46 upwards, viewing FIG. 2. Eventually, this upward movement will cause member 94 to engage plug 58, whereupon member 94 separates from stop 98 and spring 100 is compressed until land 48 engages the lower end of member 94. In this open position, lube fluid can flow unrestricted to valves 36 and 38. Valves 36 and 38 open upon partial clutch or PTO engagement. This unrestricted lube flow continues as long as pedal 25 is not totally depressed or the PTO is engaged.

In this fully raised position of valve member 46, the compressed spring 100 exerts a downward force on the valve member 46. Then, when the pedal 25 is released to re-engage clutch 10 and the pressure in chamber 60 is back up to system pressure, this downward force from spring 100 aids in overcoming the static friction between seals 54 and 56 and the walls of bore portions 42 and 44 so that valve member 46 will quickly start to move downward and back to the position shown. This helps to prevent valve member 46 from sticking in high friction situations, such as low temperatures.

When chamber 60 reaches system pressure, the valve member 46 of valve 32 is urged downwards, viewing FIG. 2, since the area of land 48 is slightly larger than the area of land 52. This downward movement causes land 52 to move against system pressure, thus forcing fluid through screen 84 and orifices 86 and 88. Because of orifices 86 and 88, this downward movement is slow so that valve 32 closes after a delay. Thus, lube flow persists for a certain time period after re-engagement of the traction clutch until valve 32 returns to its normal fully closed position. The areas of lands 48 and 52 and the size of orifices 86 and 88 can be adjusted to control how long lube flow persists after clutch re-engagement.

This delay feature is beneficial in that extra lube flow is provided between multiple manual traction clutch engagements which reduces thermal clutch destruction. Lube cut-off after engagement increases efficiency. Furthermore, this system will tend to fail to a mode in which lube flow is provided since system pressure urges valve 32 to its open flow position.

In the case of PTO lube cut-off, the ability to cut off lube flow, whether the PTO clutch is engaged or disengaged, reduces the parasitic drag on the PTO clutch which is often disengaged for long periods.

Valve 34 is a three-position (off-on-off) valve which is urged to one of its off positions by spring 110 when the PTO clutch operating pressure from valve 20 is low, such as when the PTO clutch 14 is disengaged. When the pressure from valve 20 goes high to engage PTO clutch 14, this pressure moves valve 34 to its center open position whereby lube fluid from 30 is communicated to lube circuits 12 and 16 via valves 34, 36 and 38. Spring 112 only operates to resist the movement of valve 34 past the open center position in response to the high pressure from valve 20.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. A spool valve having a housing, a valve bore extending therein to an end wall and a spool slidably and sealingly mounted in the bore, characterized by:

the spool having a stem projecting from the end thereof;

an engagement member movably mounted on the spool and projecting axially from an end of the spool to a first end which is engageable with the end wall, the engagement member being slidably carried on the stem, the engagement member comprising a hollow cylinder with a radially inwardly extending flange slidably receiving the stem, the engagement member having an axial length which exceeds an axial length of the stem, the spool and the stem cooperating to define an annular end face which faces the end wall, the engagement member having a second end which is engageable with the end face;

a resilient member coupled between the spool and the engagement member and biased to urge the engagement member away from the spool; and stop means for retaining the engagement member on the spool, for limiting movement of the engagement member and for maintaining at least a predetermined minimum bias in the resilient member, the spool being movable to a position near the end wall wherein engagement of the end wall with the first end causes disengagement of the engagement member from the stop means, thereby compressing the resilient member so that the resilient member, acting through the engagement member, is biased to urge the spool away from the end wall and away from said position.

2. The spool valve of claim 1, wherein:

the resilient member comprises a coil spring mounted coaxially on the stem.

3. The spool valve of claim 1, wherein:

the stop means comprises a snap ring held in a groove near an outer axial end of the stem, the snap ring being engageable with the flange.

* * * * *